United States Patent

Lehmann et al.

[11] Patent Number: 5,017,396
[45] Date of Patent: May 21, 1991

[54] METHOD OF CENTRIFUGING CHEESE MILK

[75] Inventors: Hanno Lehmann; Karl-Heinz Zettier, both of Oelde, Fed. Rep. of Germany

[73] Assignee: Westfalia Separator AG, Oelde, Fed. Rep. of Germany

[21] Appl. No.: 445,566

[22] Filed: Dec. 4, 1989

[30] Foreign Application Priority Data

Dec. 21, 1988 [DE] Fed. Rep. of Germany ....... 3842980

[51] Int. Cl.⁵ ............................................. A23C 9/00
[52] U.S. Cl. ..................................... 426/491; 99/466; 426/417
[58] Field of Search ............... 426/490, 491, 586, 417; 99/456, 466

[56] References Cited

U.S. PATENT DOCUMENTS 2,264,665 12/1941 Hall ..................................... 426/491
2,726,808 12/1955 Fitzsimmons ........................ 99/466

Primary Examiner—George Yeung
Attorney, Agent, or Firm—Sprung Horn Kramer & Woods

[57] ABSTRACT

A method of centrifuging cheese milk that involves skimming it in a self-emptying centrifuge, returning some of the separated cream to the skim milk to adjust it to the desired level of fat, and centrifuging it again to precipitate microorganisms and dirt particles. The method uses only one centrifuge. The raw milk is preliminarily simmed down to a desired fat content in one section of a separation space, the accordingly standardized milk is forwarded to the periphery of another section of the separation space, where it is purified of microorganisms and dirt while flowing radially inward through the section, and the standardized and purified milk is extracted from the processing space inside the centrifuge by w ay of a peeler.

3 Claims, 1 Drawing Sheet

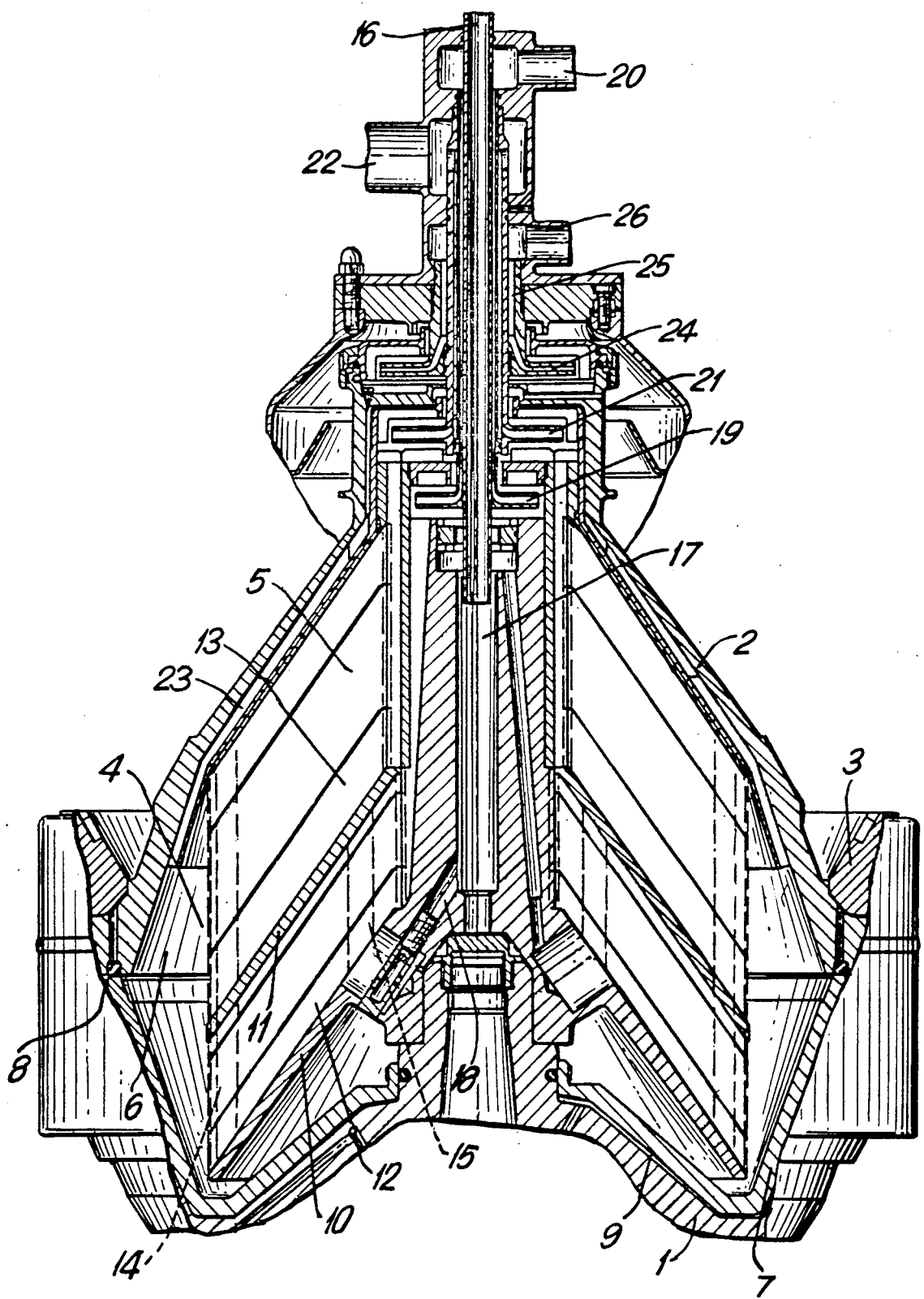

METHOD OF CENTRIFUGING CHEESE MILK

BACKGROUND OF THE INVENTION

The invention concerns a method of centrifuging cheese milk and a centrifuge for carrying out the method.

The conventional method involves skimming the cheese milk in a self-emptying centrifuge and returning some of the separated cream to the skim milk to adjust it to the desired level of fat. The accordingly treated standardized milk is put into another self-emptying centrifuge to precipitate microorganisms and dirt particles.

A centrifuge that can be employed in the second stage of this method will be evident from German AS 2 913 406. It has a drum that rotates around a vertical axis and that raw milk can be supplied to by way of a central intake pipe, a distributor, a separation space with a stack of disks, and a concentrate space, wherein channels for diverting the concentrate extend out of the concentrate space, which is provided with outlets 8 that can be closed with a piston slide 7 and opened to allow the extraction of additional slurry.

Smaller cheese makers often can not support the cost of the two-stage method with its two separate centrifuges and system for returning the cream to the milk in order to standardize the latter.

There are also varieties of cheese that cannot be made from a completely skimmed milk with cream added to it later.

SUMMARY OF THE INVENTION

The object of the invention is to improve the aforesaid method and centrifuge to the extent that the cheese milk obtained subsequent to the centrifugal treatment can be processed into a wider range of cheese than it can now and to the extent that the equipment will cost less.

This object is attained in accordance with the invention by the improvement comprising using only one centrifuge, wherein the raw milk is preliminarily skimmed down to a desired fat content in one section of a separation space, the accordingly standardized milk is forwarded to the periphery of another section of the separation space, where it is purified of microorganisms and dirt while flowing radially inward through the section, and the standardized and purified milk is extracted from the processing space inside the centrifuge by way of a peeler.

The original fat content of the raw milk is decreased in one practical embodiment of the invention from approximately 4% to approximately 3.5% in the first section of the separation space.

The object is also attained in a centrifuge of the aforesaid type by the improvement wherein the stack of disks is divided by a divider disk into first and second sections, in that the second section is above the first and has ascending channels that are all peripheral and distributed along the circumference and that extend through the lower first section of the stack, wherein the lower section of the stack also has ascending channels, which, however, terminate at the divider disk, and wherein the drum has a lower peeler for eliminating the cream, a mid-level peeler for eliminating the standardized and purified milk, and an upper peeler for diverting a concentrate with a low level of microorganisms.

It is of advantage for the separating surface of the lower section to be 1/10 as extensive as the total separating surface.

The apparatus is inexpensive because it involves only one centrifuge to both purify and standardize the milk.

BRIEF DESCRIPTION OF THE DRAWING

One embodiment of a self-emptying centrifuge for carrying out the method in accordance with the invention will now be described with reference to the FIG., which is a vertical section of a centrifuge according to the invention.

DETAILED DESCRIPTION OF THE DRAWING

The centrifuge drum has a bottom 1 and a lid 2 fastened together by a gasket 3.

Separation space 5 and concentrate space 6 constitute a centrifuging space 4. The bottom of the concentrate space is demarcated by an interior piston slide 7 that, as it travels up and down axially inside the bottom 1 of the drum, opens and closes horizontally arrayed outlets 8 for the concentrate and dirt. Associated with piston slide 7 is a closing chamber 9, to which fluid is supplied to shift the slide into the closing position and which can be switched back and forth between intake and outflow.

Separation space 5 accommodates a stack of conical disks, each pair demarcating a gap wherein the components of the incoming product are separated as intended. The stack rests on a distributor 10. The stack is divided by a divider disk 11 into a lower section 12 and an upper section 13.

Peripheral ascending channels 14 are distributed along the circumference of the stack of disks and extend from the distributor, through the lower section 12 of the stack, through divider disk 11, and through the upper section 13 of the stack. The ascending channels in upper section 13 are accordingly all peripheral.

The lower section 12 of the stack also has ascending channels 15, which are distributed along the circumference but farther toward the center than ascending channels 14.

Raw milk enters an intake chamber 17 by way of intake pipe 16 and is forwarded through channels 18 to ascending channels 15.

The milk is preliminarily skimmed to a desired fat content in lower section 12, which has a separation surface that is approximately 1/10 that of the overall separation space. The initial fat content of the milk is decreased from approximately 4% to approximately 3.5%. Given the small separation surface of the disks in the lower section, this adjustment can easily be controlled by throttling down lower peeler 19.

The cream is eliminated by way of lower peeler 19 and extracted through a connection 20.

Ascending channels 14 and 15 are created by holes through the individual disks.

The standardized milk travels from lower section 12, through ascending channels 14, and into the upper section 13 of the stack, flowing radially inward through the gaps between the disks, where it is purified of microorganisms and dirt. The standardized and purified milk is extracted by way of mid-level peeler 21 and diverted out through a connection 22.

The microorganism-containing concentrate accumulates in concentrate space 6. Concentrate that is low in microorganisms is constantly forwarded to upper peeler 24 by way of channels 23 and hence by way of an annular channel 25 to an outlet connection 26.

Particles of dirt and high-microorganism concentrate, accumulated in the concentrate space for example, are periodically removed from the drum by activating piston slide 7.

It will be appreciated that the instant specifications and claims are set forth by way of illustration and not limitation, and that various modifications and changes may be made without departing from the spirit and scope of the present invention.

We claim:

1. In a method of centrifuging cheese milk including skimming cheese milk in a self-emptying centrifuge, returning a portion of separated cream to skim milk to adjust it to a desired level of fat, and centrifuging the skim milk again to precipitate microorganisms and dirt particles, the improvement comprising skimming and centrifuging in only one centrifuge having a separation space and a processing space, preliminarily skimming the raw cheese milk down to a desired fat content in a first section of the separation space to obtain a standardized milk, forwarding the standardized milk to a periphery of a second section of the separation space, purifying the standardized milk of microorganisms and dirt while flowing radially inward through the second section, and extracting the standardized and purified milk from the processing space with a first peeler and constantly extracting low microorganism concentrate with a second peeler.

2. The method as in claim 1, wherein the original fat content of the raw milk is decreased from approximately 4% to approximately 23.5% in the first section of the separation space.

3. The method according to claim 1, wherein the step of constantly extracting comprises collecting concentrate having microorganisms in a concentrate space disposed radially outwardly of the separation space and constantly forwarding concentrate low in microorganisms from the concentrate space to an outlet with the second peeler.

* * * * *